(12) United States Patent
Moles et al.

(10) Patent No.: US 6,466,779 B1
(45) Date of Patent: Oct. 15, 2002

(54) SYSTEM AND METHOD FOR SECURE PROVISIONING OF A MOBILE STATION FROM A PROVISIONING SERVER USING IWF-BASED FIREWALL

(75) Inventors: Bryan J. Moles, Dallas; Sudhindra P. Herle, Plano, both of TX (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/520,757

(22) Filed: Mar. 7, 2000

(51) Int. Cl.[7] .......................... H04M 1/66; H04M 1/68; H04M 3/16
(52) U.S. Cl. ........................................ 455/410; 709/238
(58) Field of Search ................................ 455/410–412, 455/414, 418–419; 709/219, 222, 225, 227, 238, 223

(56) References Cited

U.S. PATENT DOCUMENTS

| | | | | |
|---|---|---|---|---|
| 5,615,340 A | * | 3/1997 | Dai et al. ............... | 395/200.17 |
| 5,901,142 A | * | 5/1999 | Averbuch et al. ........... | 370/329 |
| 6,078,582 A | * | 6/2000 | Curry et al. ................ | 370/356 |
| 6,092,110 A | * | 7/2000 | Maria et al. ................. | 709/225 |
| 6,118,778 A | * | 9/2000 | Amin .......................... | 370/352 |
| 6,151,628 A | * | 11/2000 | Xu et al. ..................... | 709/225 |

* cited by examiner

Primary Examiner—Daniel Hunter
Assistant Examiner—Tuan Tran
(74) Attorney, Agent, or Firm—John C. Han

(57) ABSTRACT

There is disclosed a security apparatus, for use in a wireless network comprising base stations that communicate with mobile stations, for preventing unprovisioned mobile stations from accessing an Internet protocol (IP) data network via the wireless network. The security apparatus comprises a database that stores a first server IP address of a first provisioning server in the wireless network, and a first controller for receiving a first IP data packet transmitted by a first mobile station, wherein the first IP data packet comprises a first source IP address and a first destination IP address. The first controller determines if the first mobile station is provisioned and transmits the first IP data packet to the IP data network if the first mobile station is provisioned. If the first mobile station is unprovisioned, the first controller transmits the first IP data packet to the IP data network if the first destination IP address matches the first server IP address and prevents transmission of the first IP data packet to the IP data network if the first destination IP address does not match the first server IP address.

27 Claims, 6 Drawing Sheets

SYSTEM AND METHOD FOR SECURE PROVISIONING OF A MOBILE STATION FROM A PROVISIONING SERVER USING IWF-BASED FIREWALL

CROSS-REFERENCE TO RELATED APPLICATIONS

The present invention is related to those disclosed in the following United States Patent Applications:

1. Ser. No. 09/500,499, filed Feb. 9, 2000, entitled "SYSTEM AND METHOD FOR SECURE OVER-THE-AIR PROVISIONING OF A MOBILE STATION FROM A PROVISIONING SERVER VIA A TRAFFIC CHANNEL;"
2. Ser. No. 09/501,468, filed Feb. 9, 2000, entitled "SYSTEM AND METHOD FOR SECURE PROVISIONING OF A MOBILE STATION FROM A PROVISIONING SERVER USING IWF-BASED IP ADDRESS TRANSLATION;"
3. Ser. No. 09/475,602, filed on Dec. 30, 1999, entitled "SYSTEM AND METHOD FOR SECURE PROVISIONING OF A MOBILE STATION FROM A PROVISIONING SERVER USING IP ADDRESS TRANSLATION AT THE BTS/BSC;" and
4. Ser. No. 09/475,760, filed on Dec. 30, 1999, entitled "SYSTEM AND METHOD FOR SECURE PROVISIONING OF A MOBILE STATION FROM A PROVISIONING SERVER USING ENCRYPTION".

The above applications are commonly assigned to the assignee of the present invention. The disclosures of these related patent applications are hereby incorporated by reference for all purposes as if fully set forth herein.

TECHNICAL FIELD OF THE INVENTION

The present invention is directed, in general, to wireless networks and, more specifically, to a system for performing secure over-the-air (OTA) provisioning of cellular phone handsets and other mobile devices.

BACKGROUND OF THE INVENTION

Reliable predictions indicate that there will be over 300 million cellular telephone customers worldwide by the year 2000. Within the United States, cellular service is offered by cellular service providers, by the regional Bell companies, and by the national long distance operators. The enhanced competition has driven the price of cellular service down to the point where it is affordable to a large segment of the population.

The current generation of cellular phones is used primarily for voice conversations between a subscriber handset (or mobile station) and another party through the wireless network. A smaller number of mobile stations are data devices, such as personal computers (PCs) equipped with cellular/wireless modems. Because the bandwidth for a current generation mobile station is typically limited to a few tens of kilobits per second (Kbps), the applications for the current generation of mobile stations are relatively limited. However, this is expected to change in the next (or third) generation of cellular/wireless technology, sometimes referred to as "3G" wireless/cellular, where a much greater bandwidth will be available to each mobile station (i.e., 125 Kbps or greater). The higher data rates will make Internet applications for mobile stations much more common. For instance, a 3G cell phone (or a PC with a 3G cellular modem) may be used to browse web sites on the Internet, to transmit and receive graphics, to execute streaming audio and/or video applications, and the like. In sum, a much higher percentage of the wireless traffic handled by 3G cellular systems will be Internet protocol (IP) traffic and a lesser percentage will be traditional voice traffic.

In order to make wireless services as convenient and as affordable as possible, wireless service providers frequently sell cellular handsets (or other types of mobile stations) directly to potential subscribers from display booths in supermarkets and department stores. Simple instructions are provided to guide the buyer through the process of activating the cellular handset and signing up for wireless services to become a subscriber. In conventional cellular systems, the handset buyer activates the new handset and begins the provisioning process by dialing "*228xx" on the handset keypad in accordance with the handset instructions. The value of "xx" varies according to the identity of the wireless service provider that sells the handset.

Although initially unprovisioned, the new handset must, of necessity, have certain minimum radio frequency (RF) communication capabilities that enable the handset to become provisioned. Dialing "*228xx" on the handset keypad automatically initiates a special purpose call that connects the handset buyer to an operator. The operator requests certain account information from the buyer, such as personal information, a credit card number, home billing address, and the like. When the account information is collected and the account is set up, the operator instructs the handset buyer to enter several sequences of passwords, code numbers, menu-selected commands, and the like, that enable certain functions in the handset.

This process is frequently referred to as "service provisioning." Service provisioning may activate in the cellular handset a Number Assignment Module (NAM), which gives the handset a unique phone number for incoming calls and provides a roaming capability by identifying approved wireless carriers. Service provisioning may also activate in the handset a Preferred Roaming List (PRL), which is a list of frequencies/bands owned by each carrier in each geographical region and which may identify preferred and/or prohibited frequencies in each region as well. Service provisioning also activates an authentication code, sometimes referred to as an "A-key," in the cellular handset. The handset uses the A-key to authenticate the handset when the subscriber attempts to access the wireless network.

The wireless network uses a home location register (HLR) to store the A-key, the phone number, the roaming capability information, and other data related to each handset that has been or is being authenticated and provisioned by the wireless network. The HLR is a permanent database used by the wireless service provider to identify/verify a subscriber and store individual subscriber data related to features and services. The subscriber's wireless service provider uses the HLR data when the subscriber is accessing the wireless network in the subscriber's home coverage area. Other wireless service providers also use the HLR data (typically accessed via wireline telephone networks) when the subscriber roams outside the subscriber's home coverage area.

The conventional provisioning process described above has numerous drawbacks. A human operator must talk the user through the process of pressing keys and verifying screen results. This is time consuming and frequently results in errors, particularly with unsophisticated subscribers. Mistakes may go unnoticed initially and the subscriber may become frustrated that the cellular service does not operate as advertised. When the mistake is finally diagnosed, the provisioning process may need to be at least partially re-performed. The human operator also adds labor costs to the provisioning process.

It would be preferable to automate cellular service provisioning to the greatest extent possible in order to reduce labor costs, eliminate errors, and make the process more userfriendly by minimizing or eliminating subscriber interaction. In particular, it would be far more convenient to perform over-the-air (OTA) cellular service provisioning by accessing a provisioning server from an unprovisioned handset via an Internet connection. In such a scenario, the handset does not place a voice call to an operator, but rather places a "data call" that transmits Internet protocol (IP) packets to, and receives IP packets from, a base station of the wireless network. The 3G systems will make OTA service provisioning of handsets easier and more common.

However, OTA service provisioning of a handset presents serious security problems for the wireless service provider, particularly with respect to fraud. The base station that handles the initial set-up data call from an unprovisioned handset may not store the required provisioning data. Instead, base stations typically access provisioning data from one or more provisioning servers within the wireless service provider's network and which may or may not be accessible by an intranet or by the Internet. Many wireless service providers operate clusters of base stations that are not directly connected to each other, but rather are connected to the local Bell telephone companies and/or to the major long-distance carriers. Without an Internet or intranet connection, each cluster of base stations would require its own provisioning server. Alternatively, a wireless carrier would have to pay the local Bell companies and/or a long distance company additional line fees to connect the base stations to the provisioning server.

Using an Internet connection allows a wireless service provider to consolidate all service provisioning applications and data in a central repository, rather than maintaining at great expense redundant copies of such information among a large number of provisioning servers. However, it is foreseeable that a sophisticated user could use an unprovisioned handset (possibly with some minor modifications) to access a wireless network under the guise of service provisioning and then use the wireless network to access any IP address on the Internet, not just the IP address of the provisioning server. In effect, the user could defraud the wireless service provider by using the unprovisioned handset to surf the Internet for free. The user may also use the same IP connection to commit other kinds of fraud or illegal activities.

This problem exists for several reasons. First, IP addresses of other services are freely known to the public. Second, conventional wireless networks do not provide a method or an apparatus capable of blocking access to unauthorized IP addresses that is triggered by the network's knowledge that the mobile is unprovisioned. Third, even if the network provides the mobile with an IP address to be used for provisioning, the mobile must be trusted to use that IP address only.

Therefore, there is a need in the art for improved systems and methods for performing automatic service provisioning of wireless handsets (and other types of mobile stations). In particular, there is a need in the art for systems and methods for performing secure over-the-air provisioning of wireless devices. More particularly, there is a need for systems and methods that are capable of preventing unauthorized persons from using an unprovisioned handset or other type of mobile station to access any IP service other than the provisioning server.

SUMMARY OF THE INVENTION

To address the above-discussed deficiencies of the prior art, it is a primary object of the present invention to provide a security apparatus for use in a wireless network comprising a plurality of base stations capable of communicating with a plurality of mobile stations. The security apparatus prevents unprovisioned mobile stations from accessing an Internet protocol (IP) data network via the wireless network. In an advantageous embodiment of the present invention, the security apparatus comprises a database capable of storing a first server IP address of a first provisioning server associated with the wireless network; and a first controller capable of receiving a first IP data packet transmitted by a first one of the plurality of mobile stations, the first IP data packet comprising a first source IP address and a first destination IP address, wherein the first controller is capable of 1) determining if the first mobile station is provisioned, 2) transmitting the first IP data packet to the IP data network if the first mobile station is provisioned, and 3) if the first mobile station is unprovisioned, one of: a) transmitting the first IP data packet to the IP data network if the first destination IP address matches the first server IP address and b) preventing transmission of the first IP data packet to the IP data network if the first destination IP address does not match the first server IP address.

According to one embodiment of the present invention, the security apparatus is disposed in an interworking function unit capable of transferring data between the wireless network and IP data network coupled to the wireless network.

According to another embodiment of the present invention, the first controller determines whether the first mobile station is provisioned by comparing the first source IP address to a plurality of IP addresses of provisioned mobile stations stored in the database.

According to still another embodiment of the present invention, the first controller determines whether the first mobile station is provisioned by comparing the first source IP address to a plurality of IP addresses of unprovisioned mobile stations stored in the database.

According to yet another embodiment of the present invention, the first controller is capable of comparing the first destination IP address to a plurality of server IP addresses stored in the database.

According to a further embodiment of the present invention, the first controller transmitting the first IP data packet to the IP data network if the first destination IP address matches any one of the plurality of server IP addresses.

According to a still further embodiment of the present invention, the first controller prevents transmission of the first IP data packet to the IP data network if the first destination IP address does not match any of the plurality of server IP addresses.

In one embodiment of the present invention, the first controller is further capable of receiving from the IP data network a second IP data packet directed to a second one of the plurality of mobile stations, the second IP data packet comprising a second source IP address and a second destination IP address, wherein the first controller is capable of 1) determining if the second mobile station is provisioned, 2) transmitting the second IP data packet to the second mobile station if the second mobile station is provisioned, and 3) if the second mobile station is unprovisioned, one of: a) transmitting the second IP data packet to the second mobile station if the second source IP address matches the first server IP address and b) preventing transmission of the second IP data packet to the second mobile station if the second source IP address does not match the first server IP address.

In another embodiment of the present invention, the first controller determines whether the second mobile station is provisioned by comparing the second destination IP address to a plurality of IP addresses of provisioned mobile stations stored in the database.

In yet another embodiment of the present invention, the first controller determines whether the second mobile station is provisioned by comparing the second destination IP address to a plurality of IP addresses of unprovisioned mobile stations stored in the database.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
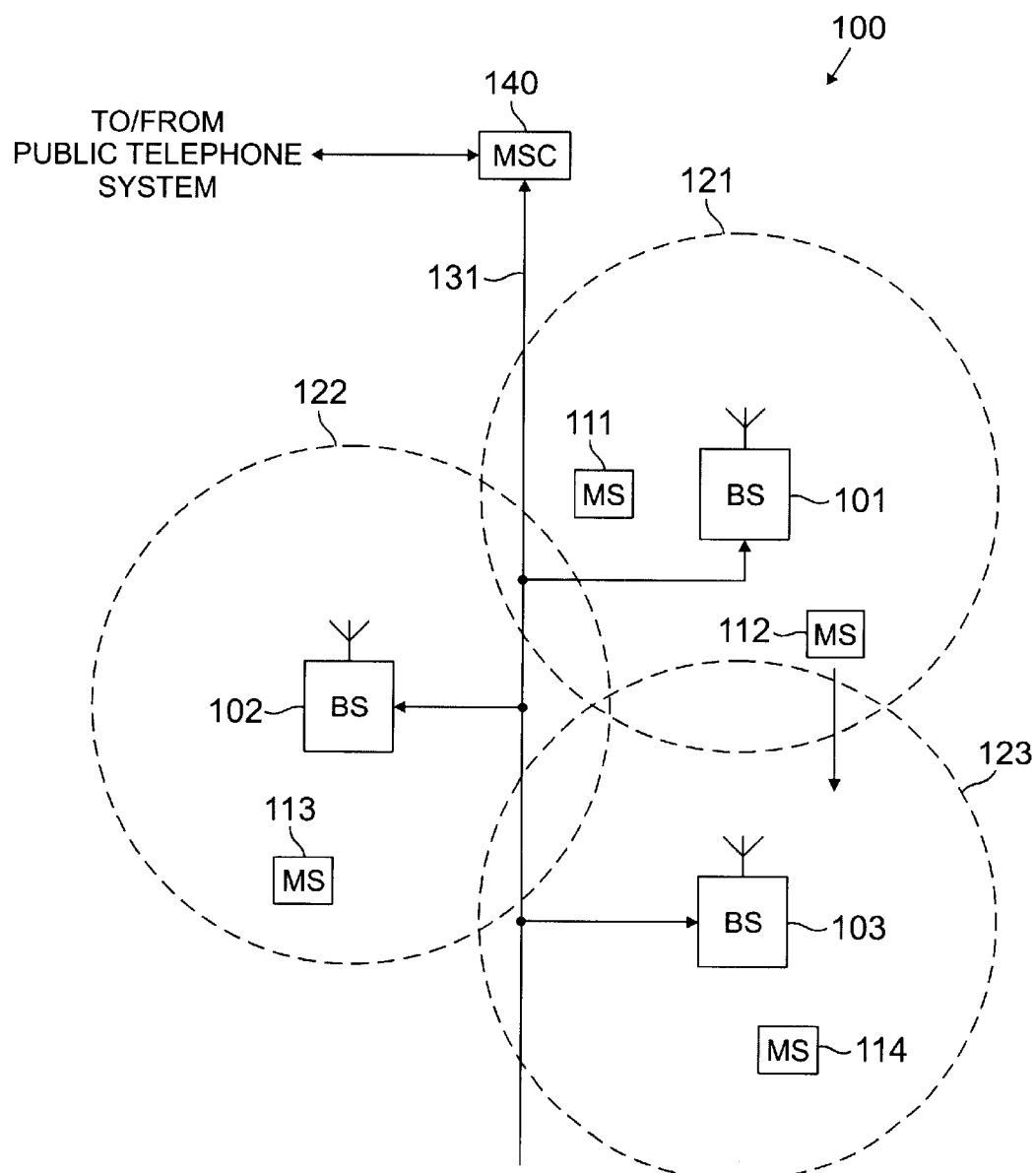
FIG. 1 illustrates a general overview of an exemplary wireless network according to one embodiment of the present invention.

FIG. 1 illustrates a general overview of an exemplary wireless network 100 according to one embodiment of the present invention. The wireless telephone network 100 comprises a plurality of cell sites 121–123, each containing one of the base stations, BS 101, BS 102, or BS 103. Base stations 101–103 are operable to communicate with a plurality of mobile stations (MS) 111–114. Mobile stations 111–114 may be any suitable wireless communication devices, including conventional cellular telephones, PCS handset devices, portable computers, telemetry devices, and the like.

Dotted lines show the approximate boundaries of the cell sites 121–123 in which base stations 101–103 are located. The cell sites are shown approximately circular for the purposes of illustration and explanation only. It should be clearly understood that the cell sites also may have irregular shapes, depending on the cell configuration selected and natural and man-made obstructions.

In one embodiment of the present invention, BS 101, BS 102, and BS 103 may comprise a base station controller (BSC) and a base transceiver station (BTS). Base station controllers and base transceiver stations are well known to those skilled in the art. A base station controller is a device that manages wireless communications resources, including the base transceiver station, for specified cells within a wireless communications network. A base transceiver station comprises the RF transceivers, antennas, and other electrical equipment located in each cell site. This equipment may include air conditioning units, heating units, electrical supplies, telephone line interfaces, and RF transmitters and RF receivers, as well as call processing circuitry. For the purpose of simplicity and clarity in explaining the operation of the present invention, the base transceiver station in each of cells 121, 122, and 123 and the base station controller associated with each base transceiver station are collectively represented by BS 101, BS 102 and BS 103, respectively.

BS 101, BS 102 and BS 103 transfer voice and data signals between each other and the public telephone system (not shown) via communications line 131 and mobile switching center (MSC) 140. Mobile switching center 140 is well known to those skilled in the art. Mobile switching center 140 is a switching device that provides services and coordination between the subscribers in a wireless network and external networks, such as the public telephone system and/or the Internet. Communications line 131 may be any suitable connection means, including a T1 line, a T3 line, a fiber optic link, a network backbone connection, and the like. In some embodiments of the present invention, communications line 131 may be several different data links, where each data link couples one of BS 101, BS 102, or BS 103 to MSC 140.

In the exemplary wireless network 100, MS 111 is located in cell site 121 and is in communication with BS 101, MS 113 is located in cell site 122 and is in communication with BS 102, and MS 114 is located in cell site 123 and is in communication with BS 103. MS 112 is also located in cell site 121, close to the edge of cell site 123. The direction arrow proximate MS 112 indicates the movement of MS 112 towards cell site 123. At some point, as MS 112 moves into cell site 123 and out of cell site 121, a "handoff" will occur.

As is well known, the "handoff" procedure transfers control of a call from a first cell to a second cell. For example, if MS 112 is in communication with BS 101 and senses that the signal from BS 101 is becoming unacceptably weak, MS 112 may then switch to a BS that has a stronger signal, such as the signal transmitted by BS 103. MS 112 and BS 103 establish a new communication link and a signal is sent to BS 101 and the public telephone network to transfer the on-going voice, data, or control signals through BS 103. The call is thereby seamlessly transferred from BS 101 to BS 103. An "idle" handoff is a handoff between cells of a mobile device that is communicating in the control or paging channel, rather than transmitting voice and/or data signals in the regular traffic channels.

One or more of mobile stations 111–114 may initially be unprovisioned devices. That is, necessary configuration data, such as Number Assignment Module (NAM) data, Preferred Roaming List (PRL) data, or authentication code (or "A-key") data may not be present in, for example, MS 112 or, if present, may not be properly configured or enabled, so that MS 112 is unable to communicate with BS 101. To enable such unprovisioned devices to operate in wireless network 100, an over-the-air (OTA) service provisioning capability is provided in wireless network 100.

Figure 2:
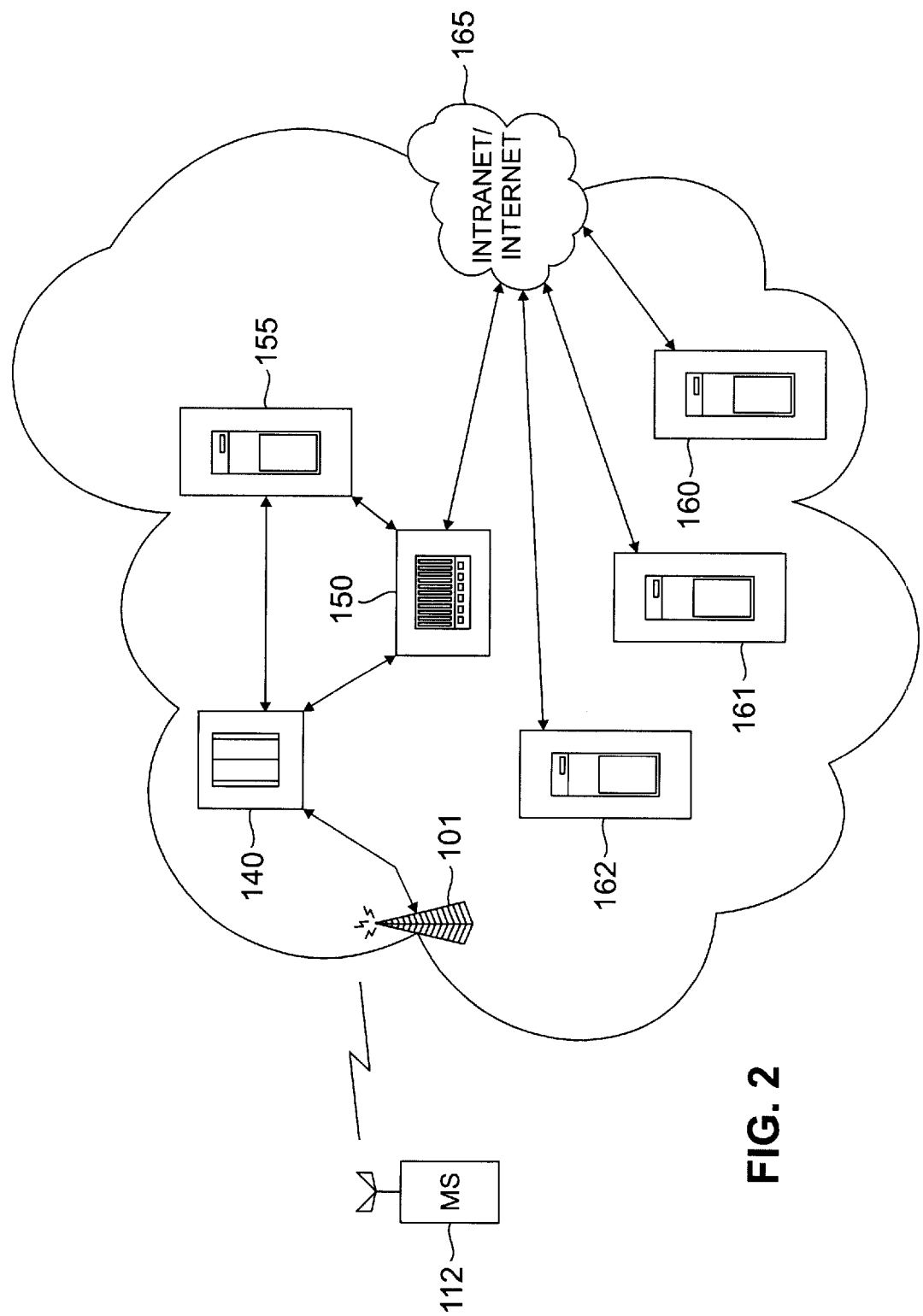
FIG. 2 illustrates an alternate view of selected portions of the exemplary wireless network in FIG. 1 that perform over-the-air (OTA) service provisioning according to one embodiment of the present invention.

FIG. 2 illustrates an alternate view of selected portions of exemplary wireless network 100 that perform over-the-air (OTA) service provisioning according to one embodiment of the present invention. MS 112, BS 101, and MSC 140 are still present, as in FIG. 1. In FIG. 2, wireless network 100 further comprises interworking function (IWF) unit 150, home location register (HLR) 155, and provisioning servers 160–162. Provisioning servers 160–162 are system-wide central servers that are located remote from the other components of wireless network 100, namely, BS 101, MSC 140, IWF unit 150, and HLR 155. In order to access data in provisioning servers 160–162, MSC 140 communicates with one of provisioning servers 160–162 via intranet/Internet 165 (hereafter "Internet 165"). Since data within wireless network 100 may be communicated in one or more of a wide variety of communication protocols, according to the choices made by the wireless service provider, IWF unit 150 is needed to translate the "native" communication transport protocol that carries application data in wireless network 100 into Internet protocol (IP) based data packets suitable for transmission in Internet 165.

One job of the IWF (normally) is to assign an IP address to a handset when the handset places a data call. In accordance with the principles of the present invention, after it is determined that the handset is unprovisioned, the IP addresses can be assigned from a special pool of addresses allocated only to unprovisioned handsets. Then, in future routing operations, the IWF may rout IP packets with the special IP addresses only to controlled destinations. In other words, packets generated by provisioned handsets may be distinguished from packets generated by unprovisioned handsets simply by looking at the previously assigned IP address.

As will be explained below in greater detail, if an unprovisioned mobile station, such as MS 112, accesses wireless network 100 (via BS 101), then BS 101 and/or MSC 140, using the handset data in HLR 155, identifies MS 112 as an unprovisioned handset and establishes a session with one of provisioning servers 160–162 via Internet 165 in order to perform service provisioning of MS 112. However, because Internet 165 is a network not owned or controlled by the wireless service provider that operates wireless network 100, the present invention provides security protection that prevents an unauthorized person from using MS 112 to access other servers/web sites in Internet 165. This security is provided by a security firewall at IWF unit 150 that prevents a call received from unprovisioned mobile stations from accessing any server on the Internet except for a selected one of provisioning servers 160–162.

It should be noted that the scope of the present invention is not limited to wireless networks that use the Internet to link base stations and provisioning servers. In alternate embodiments of the present invention, Internet 165 may actually be a large intranet having a relatively minimal amount of security that links a group of base stations to one or more provisioning servers.

Figure 3:
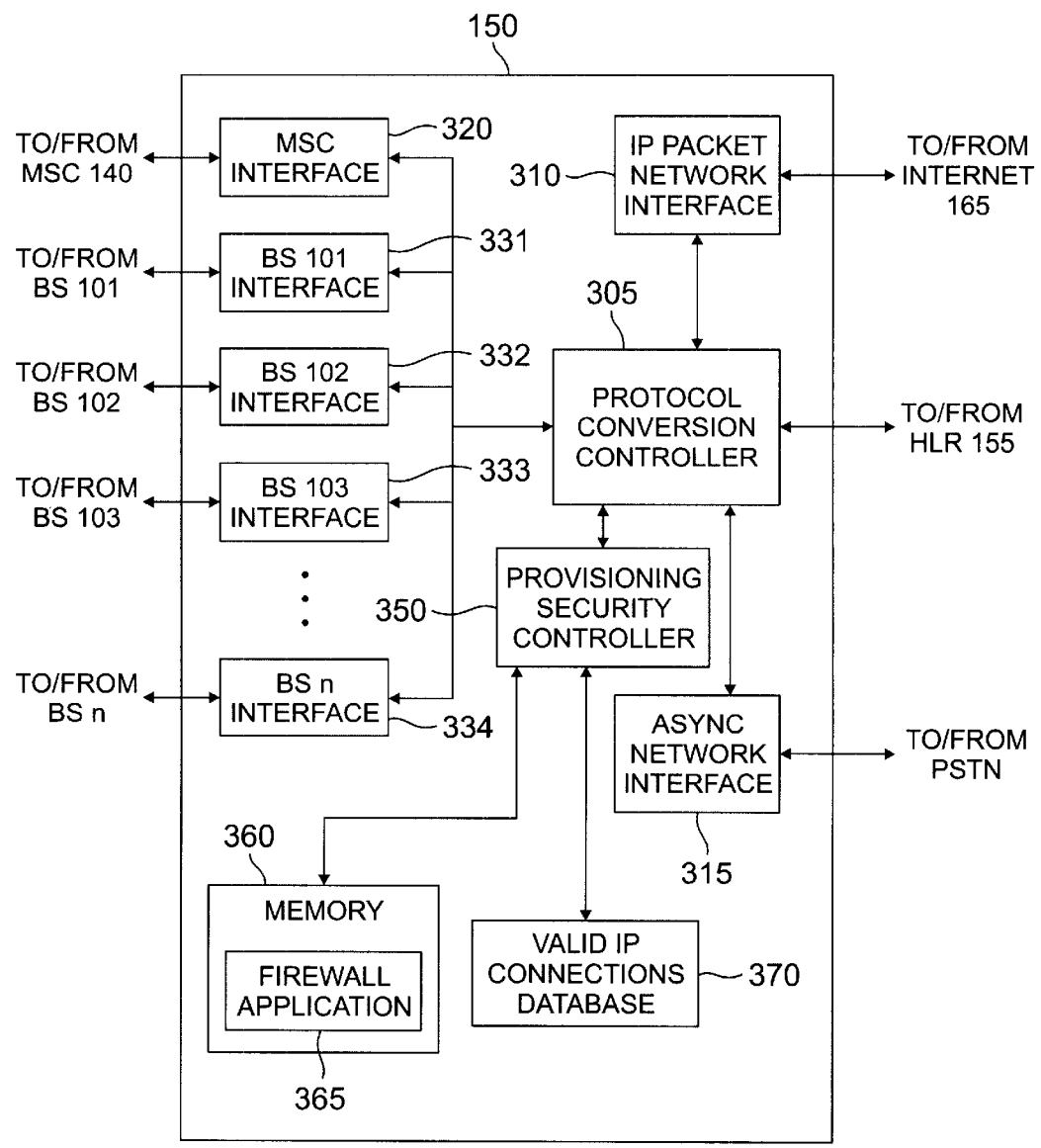
FIG. 3 illustrates in greater detail an exemplary interworking function (IWF) unit containing an IP firewall according to one embodiment of the present invention.

FIG. 3 illustrates in greater detail an exemplary interworking function (IWF) unit 150 containing an IP firewall according to one embodiment of the present invention. IWF unit 150 comprises protocol conversion controller 305, IP packet network interface 310, asynchronous (async) network interface 315, MSC interface 320, provisioning security controller 350, memory 360, and valid IP connections database 370. Memory 360 contains firewall application 365. IWF unit 150 also includes up to "N" optional base station interfaces 331–334 for transferring data traffic between protocol conversion controller 305 and one or more of BS 101, BS 102, BS 103 and other base stations in wireless network 100.

Base station interfaces 331–334, arbitrarily labeled BS 101 Interface, BS 102 Interface, BS 103 Interface, and BS N Interface, respectively, are optional since protocol conversion controller 305 in IWF unit 150 is capable of communicating with BS 101-BS 103 indirectly through MSC 140. However, in some embodiments of the present invention, IWF unit 150 may communicate directly with one or more of BS 101-BS 103 or other base stations in wireless network 100. In such embodiments, base station interfaces 331–334 provide direct communication links to the base stations.

The functions of IWF unit 150 are generally well known. The data traffic transmitted between IWF unit 150 and each of BS 101-BS 103 or MSC 140 may include fax data, circuit data and Internet protocol (IP) data. IWF unit 150 may send this data traffic to, and receive this data traffic from, the public switched telephone network (PSTN) or Internet 165, according to data type. Fax data and circuit data are sent to and received from the public switched telephone network through asynchronous network interface 315. Packet data are sent to and received from Internet 165 through IP packet network interface 310.

Protocol conversion controller 305 converts incoming and outgoing data to and from the native formats of IP packet network interface 310, asynchronous network interface 315, MSC interface 320, and base station interfaces 331–334. For example, protocol conversion controller 305 may contain, among other things, transcoding circuitry that receives data from base station interfaces 331–334 or from MSC 140 through MSC interface 320, at, for example, an 8 Kbps rate. Protocol conversion controller 305 then reformats the 8 Kbps data to a 64 Kbps rate before sending it to public switched telephone network 100 through asynchronous network interface 315. In the reverse direction, protocol conversion controller 305 converts circuit data, fax data, and packet data back to 8 Kbps format and sends it to BS 101-BS 103 or MSC 140 via base station interfaces 331–334 or MSC interface 320, respectively. Interworking function units similar to IWF unit 150 described above are available from a number of different vendors, including the CDMA IWF platform with IWF QuickNet Connect™ provided by 3COM Corporation.

Protocol conversion controller 305 and provisioning security controller 350 provide secure service provisioning for mobile stations and prevent unauthorized persons from using an unprovisioned mobile station, such as MS 112, to access servers or web sites in Internet 165 other than one of provisioning servers 160–162.

Memory 360 provides storage space for software and other data required for proper operation of provisioning security controller 350, including firewall application 365. Firewall application 365 allows unprovisioned handsets, such as MS 112, to exchange information with one of provisioning servers 160–162 on Internet 165 for provisioning purposes, while inhibiting other Internet 165 transactions to or from unprovisioned handsets.

Valid IP connections database 370 provides storage for the Internet address associated with each provisioning server, for example, one IP address for each of provisioning servers 160–162.

Valid IP connections database 370 also stores the temporary Internet address assigned to each mobile station that is communicating with Internet 165 and stores a status flag indicating the provisioned (or unprovisioned) status of each mobile station. In an alternate embodiment, IP connections database 370 may be located in memory 360 rather than being a separate memory module. The content of valid IP connections database 370 may be updated through MSC 140 under the direction of provisioning security controller 350. The information concerning the temporary IP address assignment for a particular mobile station may be provided by base station 101 or MSC 140, for example.

Figure 4:
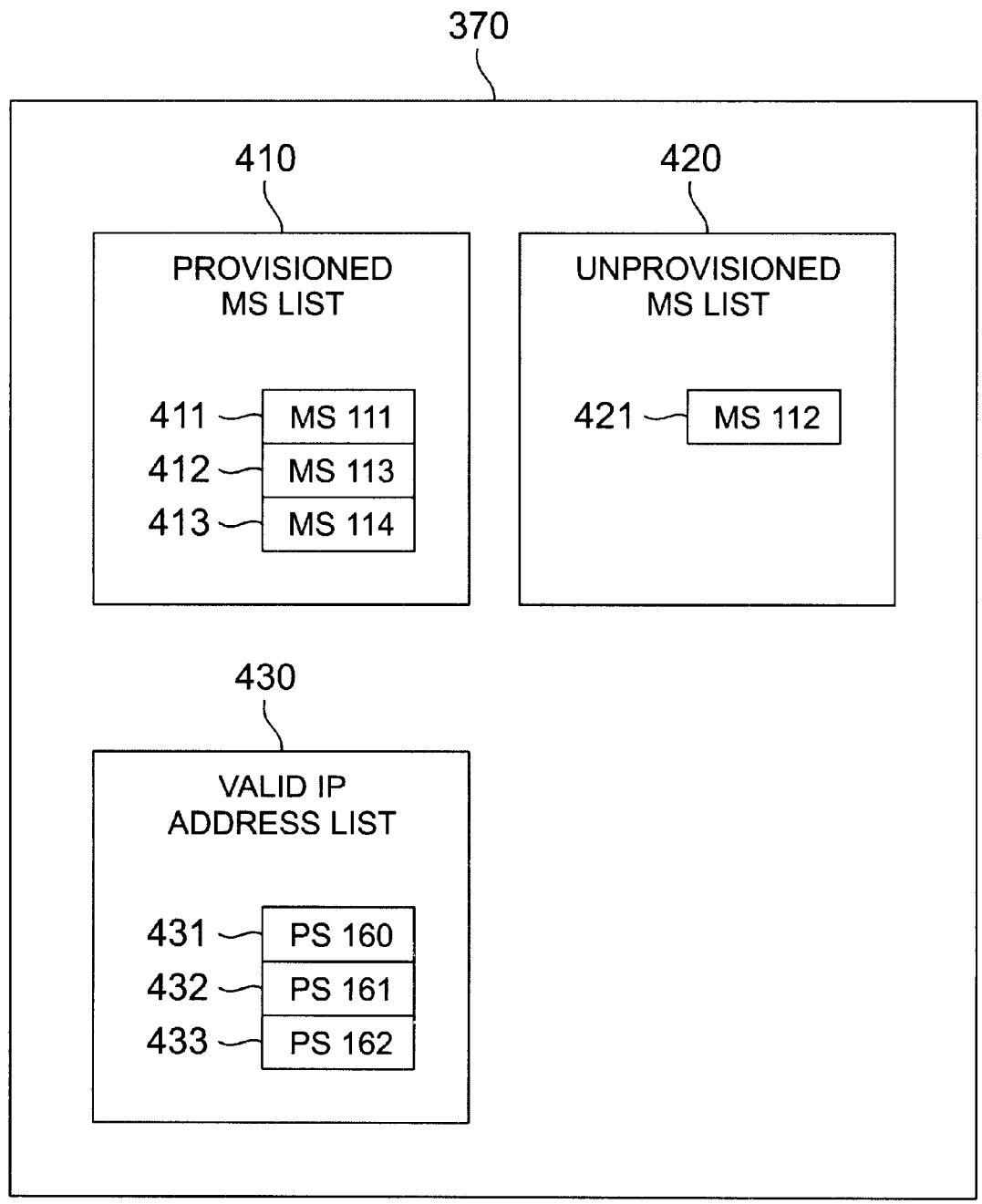
FIG. 4 illustrates in greater detail an exemplary valid IP connections database according to one embodiment of the present invention.

FIG. 4 illustrates in greater detail exemplary valid IP connections database 370 according to one embodiment of the present invention. Valid IP connections database 370 comprises provisioned mobile station (MS) list 410, unprovisioned MS list 420, and valid Internet protocol (IP) address list 430. Provisioned mobile station list 410 comprises Internet protocol (IP) addresses 411–413. IP address 411 is the IP address of MS 111, IP address 412 is the IP address of MS 113, and IP address 413 is the IP address of MS 114. Unprovisioned mobile station list 420 comprises IP address 421, the IP address of MS 112. Valid IP address list 430 comprises Internet protocol (IP) addresses 431–433. IP address 431 is the IP address of provisioning server (PS) 160, IP address 432 is the IP address of PS 161, and IP address 433 is the IP address of PS 162. Valid IP connections database 370 provides data necessary for firewall application 365 in IWF unit 150, as described below.

When IP packets are received in IWF unit 150 from base stations in wireless network 100, protocol conversion controller 305 determines the provisioning status of the originating mobile station prior to transferring the IP packets elsewhere. Protocol conversion controller 305 may determine that a mobile station has been provisioned by examining the status of a provisioned bit or message received from MSC 140 or HLR 155, for example. If MSC 140 indicates that the originating mobile station, MS 113 for example, is properly provisioned and if MS 113 is not transferring Internet data (i.e., IP packets), protocol conversion controller 305 transfers the voice/data call through asynchronous network interface 315 to PSTN 100 for normal call processing. If MSC 140 indicates that MS 113 is provisioned and is transmitting IP packets, protocol conversion controller 305 directly transfers the out-going data to Internet 165.

If MSC 140 indicates that the originating mobile station, MS 112 for example, is not provisioned, protocol conversion controller 305 transfers incoming IP packets from MS 112 to provisioning security controller 350 for further processing. Under the direction of firewall application 365, provisioning security controller 360 compares the destination IP address of IP packets from MS 112 with valid provisioning server IP addresses in valid IP address list 430. If the destination Internet address of the IP packets from unprovisioned MS 112 does not match the IP address of one of provisioning servers 160–162, provisioning security controller 350 prevents transfer of the IP packets to Internet 165.

In some embodiments of the present invention, provisioning security controller 350 may also transmit a communication error message to MS 112 through MSC 140 and BS 101. If provisioning security controller 350 determines that the destination IP address of the IP packets from unprovisioned MS 112 matches one of IP addresses 431–433 for one of provisioning servers 160–162, provisioning security controller 350 enables protocol conversion controller 305 to transfer the IP packets through IP packet network interface 310. Thus, IWF unit 150 only allows IP packet payloads from unprovisioned handsets to be transferred to Internet 165 when the destination IP address is the IP address for one of provisioning servers 160–162.

This firewall security feature prevents an unauthorized person or device from using an unprovisioned mobile station to access different web sites in Internet 165 through wireless network 100. The unauthorized person or device cannot access any web site or server other than one of provisioning servers 160–162. Provisioning servers 160–162 process legitimate service provisioning requests from unprovisioned handsets and ignore any data and/or commands not related to service provisioning requests or data that are transmitted by an unauthorized person or device using unprovisioned handsets.

When IP packets directed to a mobile station are received from Internet 165, protocol conversion controller 305 transfers the destination Internet address to provisioning security controller 350 for verification. Provisioning security controller 350 compares the destination IP address with a list of temporary IP addresses assigned to provisioned handsets as found in provisioned MS list 410. If provisioning security controller 350 matches the destination IP address with the address of a provisioned mobile station, such as the IP address of MS 113 in IP address 412, provisioning security controller 350 sends to protocol conversion controller 305 an enable signal indicating that the mobile station is provisioned and, in response, protocol conversion controller 305 transfers the incoming IP data packets to MS 113.

If the destination IP address does not match an address in provisioned MS list 410, provisioning security controller 350 may then compare the destination IP address to IP addresses listed in unprovisioned MS list 420. If the destination IP address matches, 1t for example, the IP address for MS 112 in IP address 421, provisioning security controller 350 compares the originating IP address with provisioning server IP addresses in valid IP address list 430. If the originating IP address matches an IP address for one of provisioning servers 160–162, such as IP address 431 for provisioning server 160, provisioning security controller 350 causes protocol conversion controller 305 to transfer the IP data packets to MSC 140 for transmission to MS 112, the unprovisioned mobile station.

If the destination IP address does not match an IP address in either the provisioned MS list 410 or the unprovisioned MS list 420, IWF unit 150 may discard the IP data packets. In an alternate embodiment, provisioning security controller 350 may cause protocol conversion controller 305 to transfer a communication error message to Internet 165 and MSC 140 if an IP address match is not found. Thus, IWF unit 150 only allows IP packets from one of provisioning servers 160–162 to be transferred to unprovisioned mobile stations, such as MS 112. This firewall security feature prevents an unauthorized person or device from accessing an unprovisioned mobile station in wireless network 100 through Internet 165, while allowing one of provisioning servers 160–162 to respond to legitimate service provisioning requests from unprovisioned handsets.

Figure 5:
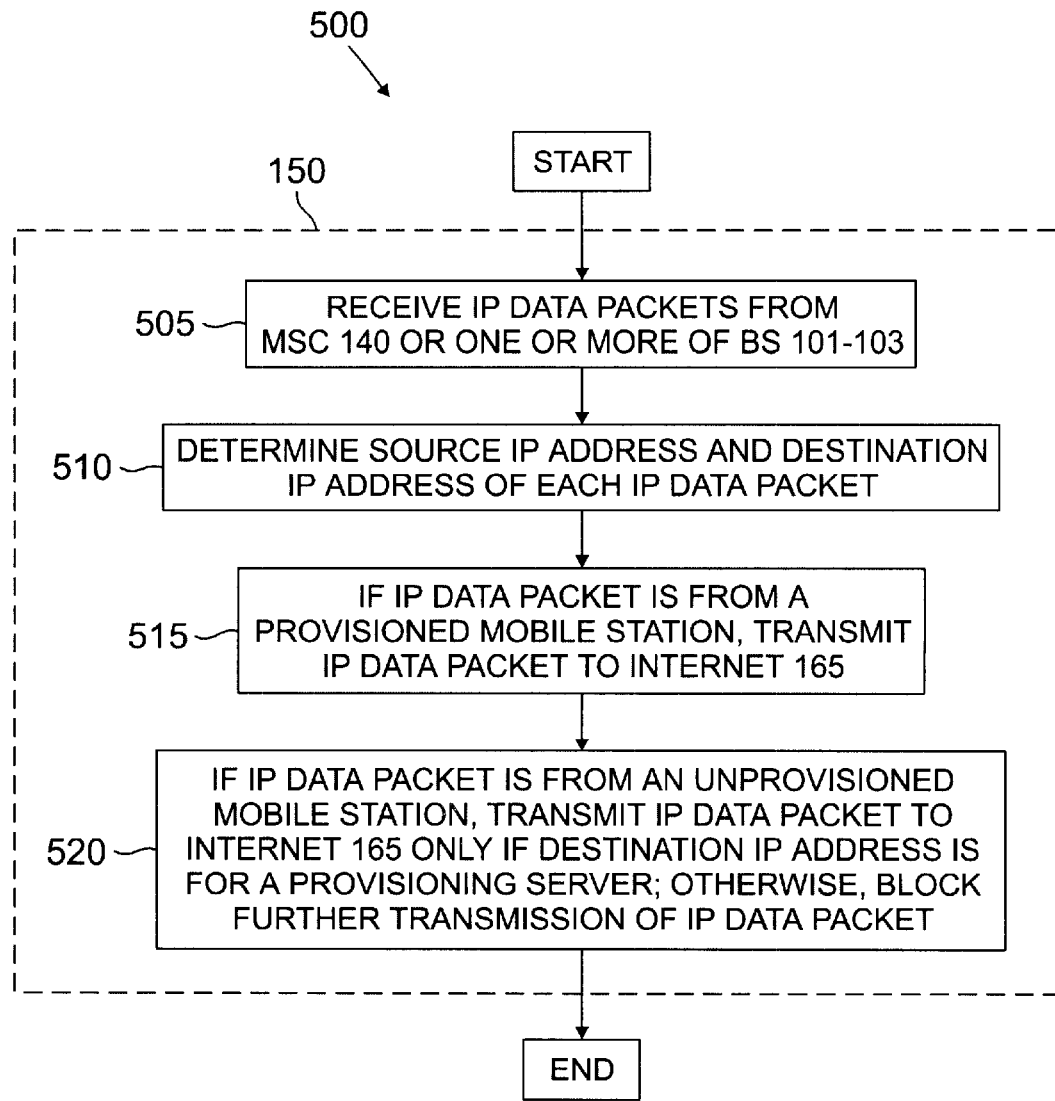
FIG. 5 is a flowchart that illustrates the operation of the exemplary interworking function unit according to one embodiment of the present invention.

FIG. 5 depicts flowchart 500, which illustrates the operation of exemplary interworking function unit 150 according to one embodiment of the present invention. Under normal operating conditions, IWF unit 150 receives IP data packets from MSC 140 or one or more of BS 101-BS 103 and transfers the IP data packets to protocol conversion controller 305 (process step 505). Next, protocol conversion controller 305 determines the source IP address and destination IP address for each IP data packet (process step 510).

If the data packet is from a provisioned mobile station, protocol conversion controller 305 transmits the IP data packet to Internet 165 (process step 515). If the IP data packet is from an unprovisioned mobile station, provisioning security controller 350 compares the destination address to valid provisioning addresses in valid IP address list 430. If provisioning security controller 350 determines that the destination IP address is valid for one of provisioning servers 160–162, protocol conversion controller 305 transfers the received voice and/or data packets to Internet 165 through IP packet network interface 310. If the destination IP address is not valid for a provisioning server, provisioning security controller 350 halts the transaction and blocks further transmission of the IP data packet (process step 520).

Figure 6:
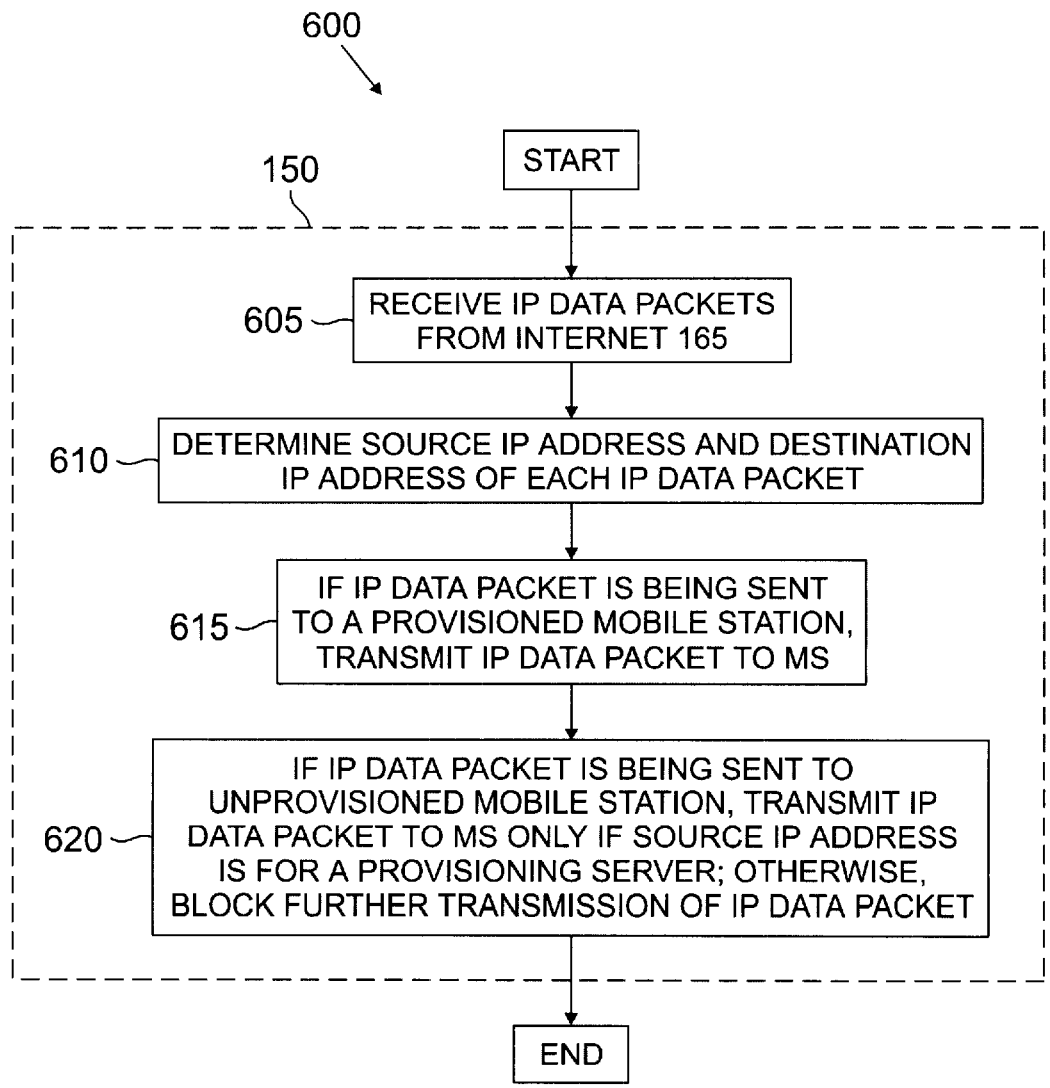
FIG. 6 is a flowchart that illustrates the operation of the exemplary interworking function unit according to a second embodiment of the present invention.

FIG. 6 depicts flowchart 600, which illustrates the operation of exemplary interworking function unit 150 according to one embodiment of the present invention. Under normal operation conditions, IWF unit 150 receives IP packets from Internet 165 through IP packet network interface 310 (process step 605). Next, protocol conversion controller 305 determines the source IP address and destination IP address of each IP data packet from Internet 165 (process step 610). Provisioning security controller 350 compares the destination IP address of each IP data packet with IP addresses for provisioned mobile stations in provisioned MS list 410. If provisioning security controller 350 finds a match with one of IP addresses 411–413, provisioning security controller 350 determines that the destination mobile station is provisioned and transmits IP data packets to the mobile station, MS 113 for example, through MSC 140 (process step 615).

If the destination IP address does not match a provisioned mobile station, provisioning security controller 350 compares the destination IP address with active unprovisioned mobile stations listed in unprovisioned MS list 420. If provisioning security controller 350 does not find a match, the transaction is halted. If provisioning security controller 350 finds a match, provisioning security controller 350 determines that the destination IP address is for an unprovisioned mobile station, MS 112 for example, and provisioning security controller 350 compares the originating IP address with valid provisioning server addresses in valid IP address list 430. If a match is not found, provisioning security controller 350 halts the transaction. If provisioning security controller 350 verifies that the origination IP address matches one of IP addresses 431–433, provisioning security controller 350 determines that the originating data is from one of provisioning servers 160–162. Protocol conversion controller 305 then transmits the IP data packets from the provisioning server to MS 112 (process step 620).

Although the present invention has been described in detail, those skilled in the art should understand that they can make various changes, substitutions and alterations herein without departing from the spirit and scope of the invention in its

What is claimed is:

1. For use in a wireless network comprising a plurality of base stations capable of communicating with a plurality of mobile stations, a security apparatus for preventing unprovisioned mobile stations from accessing an Internet protocol (IP) data network via said wireless network, said security apparatus comprising:

a database capable of storing a first server IP address of a first provisioning server associated with said wireless network; and a first controller capable of receiving a first IP data packet transmitted by a first one of said plurality of mobile stations, said first IP data packet comprising a first source IP address and a first destination IP address, wherein said first controller is capable of 1) determining if said first mobile station is provisioned, 2) transmitting said first IP data packet to said IP data network if said first mobile station is provisioned, and 3) if said first mobile station is unprovisioned, one of: a) transmitting said first IP data packet to said IP data network if said first destination IP address matches said first server IP address and b) preventing transmission of said first IP data packet to said IP data network if said first destination IP address does not match said first server IP address.

2. The security apparatus as set forth in claim 1 wherein said security apparatus is disposed in an interworking function unit capable of transferring data between said wireless network and IP data network coupled to said wireless network.

3. The security apparatus as set forth in claim 1 wherein said first controller determines whether said first mobile station is provisioned by comparing said first source IP address to a plurality of IP addresses of provisioned mobile stations stored in said database.

4. The security apparatus as set forth in claim 1 wherein said first controller determines whether said first mobile station is provisioned by comparing said first source IP address to a plurality of IP addresses of unprovisioned mobile stations stored in said database.

5. The security apparatus as set forth in claim 1 wherein said first controller is capable of comparing said first destination IP address to a plurality of server IP addresses stored in said database.

6. The security apparatus as set forth in claim 5 wherein said first controller transmitting said first IP data packet to said IP data network if said first destination IP address matches any one of said plurality of server IP addresses.

7. The security apparatus as set forth in claim 5 wherein said first controller prevents transmission of said first IP data packet to said IP data network if said first destination IP address does not match any of said plurality of server IP addresses.

8. The security apparatus as forth in claim 1 wherein said first controller is further capable of receiving from said IP data network a second IP data packet directed to a second one of said plurality of mobile stations, said second IP data packet comprising a second source IP address and a second destination IP address, wherein said first controller is capable of 1) determining if said second mobile station is provisioned, 2) transmitting said second IP data packet to said second mobile station if said second mobile station is provisioned, and 3) if said second mobile station is unprovisioned, one of: a) transmitting said second IP data packet to said second mobile station if said second source IP address matches said first server IP address and b) preventing transmission of said second IP data packet to said second mobile station if said second source IP address does not match said first server IP address.

9. The security apparatus as set forth in claim 8 wherein said first controller determines whether said second mobile station is provisioned by comparing said second destination IP address to a plurality of IP addresses of provisioned mobile stations stored in said database.

10. The security apparatus as set forth in claim 8 wherein said first controller determines whether said second mobile station is provisioned by comparing said second destination IP address to a plurality of IP addresses of unprovisioned mobile stations stored in said database.

11. A wireless network comprising:
a plurality of base stations capable of communicating with a plurality of mobile stations; and
a security apparatus for preventing unprovisioned mobile stations from accessing an Internet protocol (IP) data network via said wireless network, said security apparatus comprising:
a database capable of storing a first server IP address of a first provisioning server associated with said wireless network; and
a first controller capable of receiving a first IP data packet transmitted by a first one of said plurality of mobile stations, said first IP data packet comprising a first source IP address and a first destination IP address, wherein said first controller is capable of 1) determining if said first mobile station is provisioned, 2) transmitting said first IP data packet to said IP data network if said first mobile station is provisioned, and 3) if said first mobile station is unprovisioned, one of: a) transmitting said first IP data packet to said IP data network if said first destination IP address matches said first server IP address and b) preventing transmission of said first IP data packet to said IP data network if said first destination IP address does not match said first server IP address.

12. The wireless network as set forth in claim 11 wherein said security apparatus is disposed in an interworking function unit capable of transferring data between said wireless network and IP data network coupled to said wireless network.

13. The wireless network as set forth in claim 11 wherein said first controller determines whether said first mobile station is provisioned by comparing said first source IP address to a plurality of IP addresses of provisioned mobile stations stored in said database.

14. The wireless network as set forth in claim 11 wherein said first controller determines whether said first mobile station is provisioned by comparing said first source IP address to a plurality of IP addresses of unprovisioned mobile stations stored in said database.

15. The wireless network as set forth in claim 11 wherein said first controller is capable of comparing said first destination IP address to a plurality of server IP addresses stored in said database.

16. The wireless network as set forth in claim 15 wherein said first controller transmitting said first IP data packet to said IP data network if said first destination IP address matches any one of said plurality of server IP addresses.

17. The wireless network as set forth in claim 15 wherein said first controller prevents transmission of said first IP data packet to said IP data network if said first destination IP address does not match any of said plurality of server IP addresses.

18. The wireless network as forth in claim 11 wherein said first controller is further capable of receiving from said IP data network a second IP data packet directed to a second one of said plurality of mobile stations, said second IP data packet comprising a second source IP address and a second destination IP address, wherein said first controller is capable of 1) determining if said second mobile station is provisioned, 2) transmitting said second IP data packet to said second mobile station if said second mobile station is provisioned, and 3) if said second mobile station is unprovisioned, one of: a) transmitting said second IP data packet to said second mobile station if said second source IP address matches said first server IP address and b) preventing transmission of said second IP data packet to said second mobile station if said second source IP address does not match said first server IP address.

19. The wireless network as set forth in claim 18 wherein said first controller determines whether said second mobile station is provisioned by comparing said second destination IP address to a plurality of IP addresses of provisioned mobile stations stored in said database.

20. The wireless network as set forth in claim 18 wherein said first controller determines whether said second mobile station is provisioned by comparing said second destination IP address to a plurality of IP addresses of unprovisioned mobile stations stored in said database.

21. For use in a wireless network comprising a plurality of base stations capable of communicating with a plurality of mobile stations, a method of preventing unprovisioned mobile stations from accessing an Internet protocol (IP) data network via the wireless network, the method comprising the steps of:
storing in a database a first server IP address of a first provisioning server associated with the wireless network;
receiving a first IP data packet transmitted by a first one of the plurality of mobile stations, the first IP data packet comprising a first source IP address and a first destination IP address;
determining if the first mobile station is provisioned;
if the first mobile station is provisioned, transmitting the first IP data packet to the IP data network; and
if the first mobile station is unprovisioned, one of:
transmitting the first IP data packet to the IP data network if the first destination IP address matches the first server IP address; and preventing transmission of the first IP data packet to the IP data network if the first destination IP address does not match the first server IP address.

22. The method as set forth in claim 21 wherein the step of determining whether the first mobile station is provisioned comprises the substep of comparing the first source IP address to a plurality of IP addresses of provisioned mobile stations stored in the database.

23. The method as set forth in claim 21 wherein the step of determining whether the first mobile station is provisioned comprises the substep of comparing the first source IP address to a plurality of IP addresses of unprovisioned mobile stations stored in the database.

24. The method as set forth in claim 21 further including the step of comparing the first destination IP address to a plurality of server IP addresses stored in the database.

25. The method as forth in claim 21 further comprising the steps of:

receiving from the IP data network a second IP data packet directed to a second one of the plurality of mobile stations, the second IP data packet comprising a second source IP address and a second destination IP address;

determining if the second mobile station is provisioned;

if the second mobile station is provisioned, transmitting the second IP data packet to the second mobile station; and if the second mobile station is unprovisioned, one of:

transmitting the second IP data packet to the second mobile station if the second source IP address matches the first server IP address; and preventing transmission of the second IP data packet to the second mobile station if the second source IP address does not match the first server IP address.

26. The method as set forth in claim 25 wherein the step of determining whether the second mobile station is provisioned comprises the substep of comparing the second destination IP address to a plurality of IP addresses of provisioned mobile stations stored in the database.

27. The method as set forth in claim 25 wherein the step of determining whether the second mobile station is provisioned comprises the substep of comparing the second destination IP address to a plurality of IP addresses of unprovisioned mobile stations stored in the database.

* * * * *